No. 623,573. Patented Apr. 25, 1899.
M. F. SINCLAIR.
COUPLING FOR AIR PIPES OF RAILWAY CARS.
(Application filed May 3, 1898.)
(No Model.) 2 Sheets—Sheet 1.
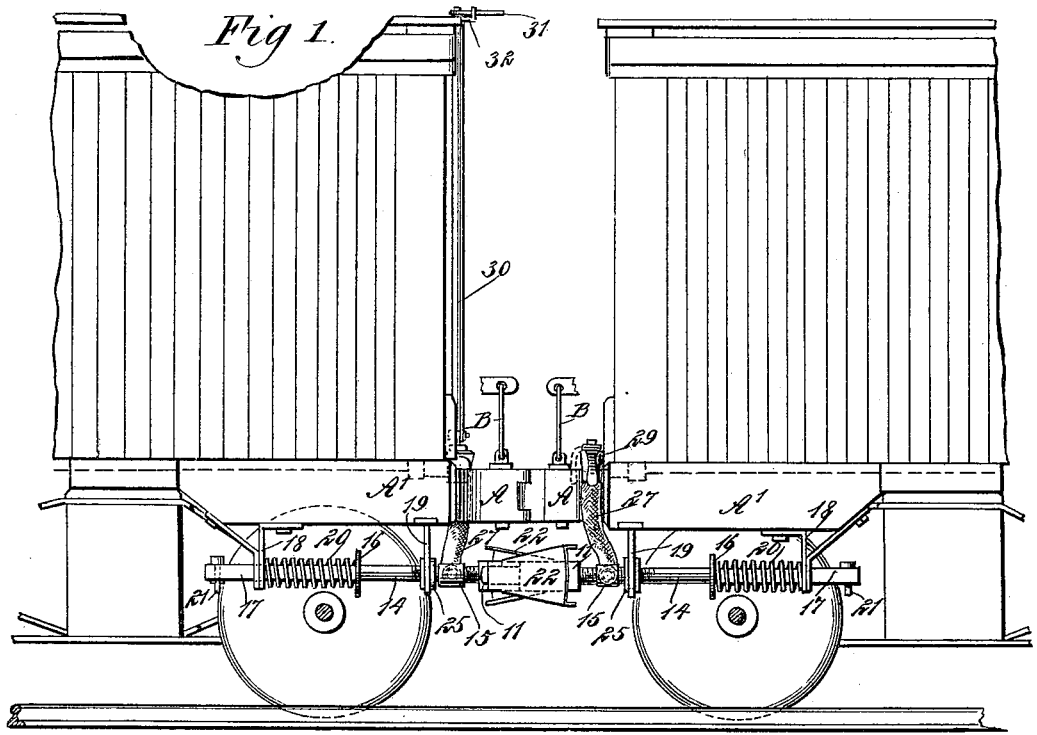
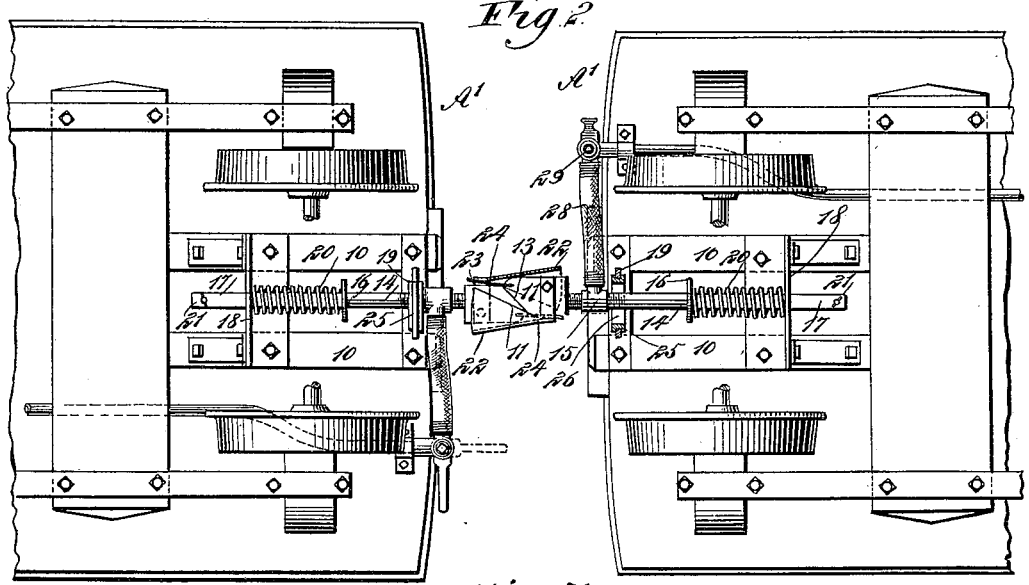
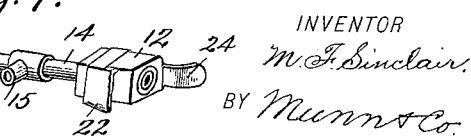
WITNESSES:
INVENTOR
M. F. Sinclair,
BY Munn & Co.
ATTORNEYS.
THE NORRIS PETERS CO., PHOTO-LITHO., WASHINGTON, D. C.

No. 623,573. Patented Apr. 25, 1899.
M. F. SINCLAIR.
COUPLING FOR AIR PIPES OF RAILWAY CARS.
(Application filed May 3, 1898.)
(No Model.) 2 Sheets—Sheet 2.
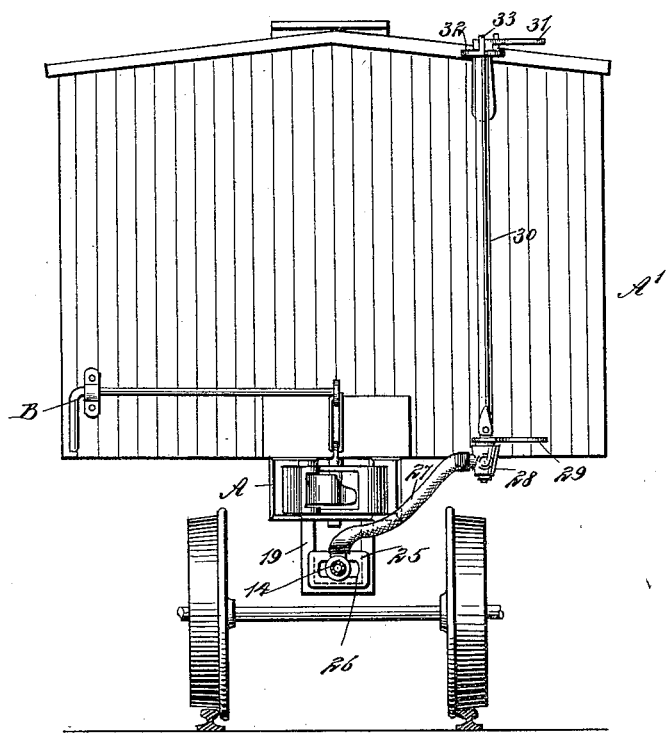
INVENTOR
M. F. Sinclair
BY Munn & Co.
ATTORNEYS.

UNITED STATES PATENT OFFICE.

MILLARD F. SINCLAIR, OF HUMBOLDT, TENNESSEE, ASSIGNOR OF ONE-HALF TO JAMES GILLEN, OF SAME PLACE.

COUPLING FOR AIR-PIPES OF RAILWAY-CARS.

SPECIFICATION forming part of Letters Patent No. 623,573, dated April 25, 1899.

Application filed May 3, 1898. Serial No. 679,590. (No model.)

*To all whom it may concern:*

Be it known that I, MILLARD F. SINCLAIR, of Humboldt, in the county of Gibson and State of Tennessee, have invented a new and Improved Coupling for the Air-Pipes of Railway-Cars, of which the following is a full, clear, and exact description.

The object of my invention is to provide a coupling for air-brake hose and air-signal hose of railway-cars, which coupling will be exceedingly simple, durable, and economic and capable of automatic connection with a fellow coupling.

Another object of the invention is to construct such couplings so that when brought together they will be held firmly in communication and to so mount the couplings of the cars that the couplings may move vertically or laterally without danger of their becoming separated.

A further object of the invention is to provide a coupling for air-brake hose and air-signal hose in which the current of air passing through the coupling and which is adapted to be applied to the brakes is entirely separated from the current of air that is intended to operate the signal-whistle.

A further object of the invention is to provide a means whereby the angle-cocks of the hose may be operated from the ground or from the top of a car or within the vestibule of a vestibule-car.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of two cars coupled, illustrating the application thereto of the improved air-hose couplers. Fig. 2 is a bottom plan view of the cars shown in Fig. 1, a portion of one of the couplers being in horizontal section. Fig. 3 is an end view of a car having the improvement applied, the shank of the hose-coupler being in vertical section. Fig. 4 is a detail perspective view of a coupling-head and parts immediately attached thereto. Fig. 5 is a partial side elevation of a car, illustrating the application thereto of a hose-coupler of the double type, arranged to independently receive currents of air for the brakes and currents of air for the signal-whistle; and Fig. 6 is a detail perspective view of a part of the upper portion of a car and the mechanism for operating the angle-cock of the air-supplying hose from the top of the car. Fig. 7 is a detail perspective view of a coupling-head and parts immediately attached thereto, the hood for said head being partly broken away.

A represents car-couplings of any approved type, secured to cars A' in any approved manner and provided with any desirable form of link or knuckle operating devices B. The improved device may be applied to the drawbars of the couplers A employed or to the sills 10 of the car, the application being preferably made to the latter, as illustrated. Each car is provided with a coupling-head 11, which has a portion 12 of one of its side faces inclined, and in the inclined portion 12 of the head an ordinary air-inlet valve 13 is located. The inlet-valve of the coupling-head is in communication with a tubular shank 14, provided with a branch 15, and preferably at the rear end of the tubular shank 14 a collar 16 is secured, and back of the collar a solid bar 17 is located integral with or attached to the collar on the tubular shank. The bar 17 is rectangular in cross-section, and the said bar is adapted to enter a correspondingly-shaped opening in a rear hanger 18, secured to the sills 10, the tubular portion 14 of the shank being passed through a horizontal opening 26 in an idler-frame 25, which frame has vertical movement in a stirrup-hanger 19, secured to the sills 10 near the end of the car, so that the shank portions of a coupling-head may have vertical as well as lateral movement, in order to prevent the possibility of uncoupling when the cars sway laterally or move vertically.

A spring 20 is coiled around the polygonal portion 17 of the shank of the coupling-head, the spring bearing against the rear hanger 18 and against the collar 16, as shown in Figs. 1, 2, and 3. A pin 21 is passed through the rear end of the shank of the coupling-head at the rear of the hanger 18, preventing the shank from being withdrawn from its hangers. Each coupling-head is provided with a hood 22, which is secured to the rear portion of the head, and the said hood is made to face the inclined surface 12 of the head, as is particularly shown in Figs. 2 and 4. The hood is of tapering form and is outwardly flared, diverging from the inclined surface 12, and the inner end of the hood is its contracted end. The hood preferably consists of a side section $a$ and a top and a bottom section $a'$, and an opening 23 is made to intervene the side section $a$ at its inner end and the opposing face of the coupling-head, as is illustrated in Fig. 2. A spring-tongue 24 is secured to the apex or contracted end of the coupling-head, as is best shown in Fig. 2, and the said spring-tongue is usually given an inclination away from the hood 22. The hood of one coupling is adapted to receive and guide the spring 24 of an opposing coupling, the springs when the coupling is effected passing out through the openings 23 in the hoods, as shown in Fig. 2, and the bearing of the springs against the hoods is sufficient to cause the inclined faces of the opposing coupling-heads to be brought to and held in close engagement with each other.

A hose 27 is attached to the pipes at the bottom of the car, adapted to supply air for the brakes, the connection between the hose and such pipes being through the medium of an angle-cock 28, and the hose 27 is attached to the branch 15 of the tubular section of the coupling-head shank. The angle-cock 28 may be operated from a point near the ground or within a vestibule by means of a handle 29, attached to the upper end of its plug, or the angle-arm may be operated from the top of the car by passing a rod 30 upward from the plug of the angle-cock and providing a handle 31 at the upper end of the rod. When this construction is employed, the handle is preferably made to turn between lugs 33, projected from a disk 32, secured to a car, and in which the upper end of the rod 30 is journaled, the lugs 33 limiting the movement of the upper handle 31, as shown in Fig. 6.

The form of coupling above described may be termed the "single" form, in which the air is supplied through the coupling for the brakes only. A double form of coupling is shown in Fig. 5, in which the coupling is adapted to independently convey air for braking purposes and for signaling purposes. To that end, in addition to the inlet-valve 13, a second inlet-valve 13$^a$ is employed below the valve 13. The valve 13 is connected with the tubular shank of the coupling-head in the manner above described; but the valve 13$^a$ is connected by a pipe 34 with a hose 35, the hose in its turn being connected with a suitable line of pipe beneath the car intended to convey air for signaling purposes. The construction of the single and the double form of head is the same, with the exception that the double head is provided with the two valves above referred to, and the hood 22 is made sufficiently wide to receive the inclined surface of the head and the two valves carried thereby.

This device is exceedingly simple, durable, and economic, as stated, and is applicable to freight or to passenger cars, and may be readily applied to any car fitted with air-conducting tubes for braking or for signaling purposes, the attachment consisting only of the heads and the shanks for the heads, together with a few other attached parts.

Having thus described my invention, I claim as new and desire to secure by Letters Patent—

1. In a hose-coupling, a coupling-head having an inclined face, an inlet-valve in the said face, a tapering hood secured opposite the inclined face of the head, and a spring projecting from the head opposite the said hood, for the purpose set forth.

2. In a hose-coupling, a coupling-head provided with an inclined face having an inlet-valve, a tapering hood secured to the head opposite the inclined face, the rear and the forward ends of the hood being open, and a spring-tongue projected from the head opposite the hood, having a lateral inclination opposite to the lateral inclination of the hood, for the purpose set forth.

3. In a hose-coupling, a coupling-head provided with an inclined face having an inlet-valve, a tubular shank communicating with the said valve, a tapering hood located opposite the inclined face of the head, being attached to the said head and having an inclination from its connection with the hood laterally in an outwardly direction, the hood being also longitudinally tapered in a rearwardly direction, the front and the rear ends of the hood being open, and a spring-tongue projected from the forward contracted portion of the head, the spring-tongue being inclined laterally in a direction opposite to the lateral inclination of the hood, for the purpose set forth.

4. In a hose-coupling, the combination, with hangers, one of the said hangers being provided with a link mounted for vertical movement in the hanger, a spring-controlled shank held against turning in one of the hangers and extending through the link in the opposite hanger, the outer end of the shank being tubular, of a coupling-head secured to the tubular portion of the said shank, the said head being provided with an inclined surface having an inlet-valve in communication with the said shank, the shank being provided with means for connection with a hose, a tapering hood attached to the coupling-head opposite the inclined face of the said head, the hood being open at the front and at the rear, the sides of the hood extending beyond the top and the bottom of the coupling-head, and a spring-tongue attached to the coupling-head facing the hood and having a lateral inclination in an opposite direction to the corresponding inclination of the hood, for the purpose set forth.

MILLARD F. SINCLAIR.

Witnesses:
  JNO. M. SEUTER,
  T. W. SAUNDERS.